US009621544B2

United States Patent
Taboso (10) Patent No.: US 9,621,544 B2
(45) Date of Patent: Apr. 11, 2017

(54) COMPUTER IMPLEMENTED METHOD OF ANALYZING X.509 CERTIFICATES IN SSL/TLS COMMUNICATIONS AND THE DATA-PROCESSING SYSTEM

(71) Applicant: The Boeing Company, Chicago, IL (US)

(72) Inventor: Pedro Ballesteros Taboso, Madrid (ES)

(73) Assignee: THE BOEING COMPANY, Chicago, IL (US)

(*) Notice: Subject to any disclaimer, the term of this patent is extended or adjusted under 35 U.S.C. 154(b) by 12 days.

(21) Appl. No.: 14/789,231

(22) Filed: Jul. 1, 2015

(65) Prior Publication Data

US 2016/0080363 A1 Mar. 17, 2016

(30) Foreign Application Priority Data

Sep. 11, 2014 (EP) ..................... 14382338

(51) Int. Cl.
  *H04L 29/06* (2006.01)
(52) U.S. Cl.
  CPC ...... *H04L 63/0823* (2013.01); *H04L 63/1425* (2013.01); *H04L 63/1441* (2013.01); *H04L 63/166* (2013.01); *H04L 63/168* (2013.01)
(58) Field of Classification Search
  CPC ............. H04L 63/0823; H04L 63/1425; H04L 63/1441; H04L 63/63; H04L 63/166; H04L 63/168
  USPC ...................................................... 713/156
  See application file for complete search history.

(56) References Cited

U.S. PATENT DOCUMENTS

| 7,533,407 | B2* | 5/2009 | Lewis | G06F 21/552 726/24 |
| 9,165,126 | B1* | 10/2015 | Johansson | G06F 21/31 |
| 2004/0006695 | A1* | 1/2004 | Ishibashi | G06Q 20/341 713/175 |
| 2004/0125959 | A1* | 7/2004 | Beuque | H04L 9/0891 380/279 |
| 2004/0230803 | A1* | 11/2004 | Kuhls | G06F 21/33 713/176 |

(Continued)

FOREIGN PATENT DOCUMENTS

EP 2651099 10/2013

OTHER PUBLICATIONS

European Patent Office; Extended European Search Report for Serial No. 14382338.3 dated Mar. 27, 2015.

(Continued)

*Primary Examiner* — Michael S McNally
(74) *Attorney, Agent, or Firm* — Parsons Behle & Latimer (57) ABSTRACT

A computer implemented method of analyzing X.509 certificates in SSL/TLS communications, and the data processing system for implementing said method, that may include: extracting X.509 certificates from SSL/TLS Handshake protocols; monitoring each extracted X.509 certificate for evaluating, using the processor, a grade of polymorphism that the X.509 certificate exhibits; and, storing the X.509 certificate in the certificate database if the X.509 certificate is not previously stored in the certificate database or, if the X.509 certificate exhibits a grade of polymorphism with respect to a previously stored version of the X.509 certificate.

15 Claims, 3 Drawing Sheets

(56) References Cited

U.S. PATENT DOCUMENTS

| | | | | |
|---|---|---|---|---|
| 2007/0067620 A1* | 3/2007 | Jevans | ............... | H04L 63/0823 |
| | | | | 713/156 |
| 2007/0198835 A1* | 8/2007 | Mudhar | ............. | H04L 63/0442 |
| | | | | 713/171 |
| 2011/0012711 A1* | 1/2011 | Abe | ........................ | G06F 21/32 |
| | | | | 340/5.82 |
| 2014/0052849 A1* | 2/2014 | Sabin | ...................... | H04L 43/10 |
| | | | | 709/224 |
| 2014/0282916 A1* | 9/2014 | Gast | ................... | H04L 63/0823 |
| | | | | 726/4 |
| 2015/0095995 A1* | 4/2015 | Bhalerao | ............ | H04L 63/0823 |
| | | | | 726/6 |

OTHER PUBLICATIONS

Extracting Certificates from Live Traffic: A Near Real-Time SSL Notary Service; International Computer Science Institute;TR-12-014; Amann et al dated Nov. 2012.

* cited by examiner

COMPUTER IMPLEMENTED METHOD OF ANALYZING X.509 CERTIFICATES IN SSL/TLS COMMUNICATIONS AND THE DATA-PROCESSING SYSTEM

CROSS-REFERENCE TO RELATED APPLICATIONS

This application, under 35 U.S.C. §119, claims the benefit of E.P. Application No. 14382338.3, filed on Sep. 11, 2014 and entitled "A computer implemented method of analyzing X.509 certificates in SSL/TLS communications and the data-processing system," the contents of which are hereby incorporated by reference in their entirety.

FIELD OF THE DISCLOSURE

The present disclosure generally relates to a computer implemented method of analyzing X.509 certificates in security socket layer (SSL) and transport layer security (TLS) communications and the data processing system for implementing said method. Said system and method have been foreseen for improving the detection ratio of network security tools, when dealing with malware, by using SSL/TLS communication channels. The disclosure herein gathers malign certificates X.509 that are monitored and tracked and their grade of polymorphism and their evolution over time is determined.

The present disclosure also discloses a mechanism for establishing effective IDS/IPS (Intrusion Detection Systems/Intrusion Prevention Systems) signatures on the SSL/TLS handshake and by building certificate blacklists to be included in current malware detection network tools. In order to create malware signatures and determine behavior patterns for new malware using SSL/TLS encrypted communication channels, it is key to create a database to store as many malicious X.509 certificates as possible. This is the objective of this disclosure.

The field of application of the present disclosure is the improvement of the traditional network security tools; especially, the improvement of the detection ratio of these network security tools in communications that employ SSL or TLS encrypted communication channels through network servers that deal with malware.

BACKGROUND

The telecommunications world is relying more and more on Information Technology Systems to provide new functionalities. Thus, malware is a new threat to deal with. Malware families are increasingly adopting standard cryptographic suites like Secure Socket Layer (SSL) or Transport Layer Security (TLS) for their communication. Both, SSL and TLS protocols are based on the exchange of X.509 certificates.

Traditional network security tools such as IDS (Intrusion Detection Systems) or IPS (Intrusion Prevention Systems) have a good detection of abnormal and malicious behavior of the network elements when they work with non-encrypted traffic. However, detection systems suffer significantly in the presence of encrypted traffic, highly reducing their detection ratio. New trends show that some malware families have recently started to use standard encryption techniques (such as SSL/TLS) to avoid being detected by network security tools. Predictions say that this fact will be more and more frequent in the future.

Custom-made protocols are often used by malware to obfuscate their Command and Control (C&C) communications, but are typically easy to detect over the network because they are not used by benign traffic, which makes them easy to pick up (e.g. using network signatures). Also, writing secure cryptographic protocols is a hard task and malware authors often make mistakes that result in insecure (from their point of view) communications.

Having realized these limitations, developers of malware families are increasingly adopting standard cryptographic suites like SSL/TLS for their communications. The problem of malware using SSL/TLS is well known to the security community, however very little work has been done to really analyze this threat in a systematic way. Detecting this kind of malware is largely an open research question.

Malware families are adopting standard cryptographic suites like SSL/TLS for their communication. In particular, malware is increasingly using HTTPS (HTTP over SSL/TLS) protocol because it is a protocol widely used in benign web surfing and web applications. This, in turn, means that most protected networks will have their firewall open for outbound traffic on port 443/TCP, which is important for malware to be able to reach the Command and Control (C&C) infrastructure of said networks. Since HTTPS is widely used in benign network traffic it becomes challenging to distinguish malign HTTPS traffic from benign HTTPS traffic.

A current technique employed for improving the malware detection ratios with encrypted traffic network consists in adding high entropy detectors to an existing bot detection tool that uses deep packet inspection techniques for restoring bot visibility (Detecting Encrypted Botnet Traffic. Han Zhang, Christos Papadopoulos, Dan Massey, 2013). Document "No attack necessary: The surprising Dynamics of SSL Trust Relationships. Bernhard Amann et al. (2013)" discloses which degree benign changes to X.509 certificate ecosystems share structural properties with attacks. Document "Here's my cert, so trust me, maybe? Understanding TLS Errors on the Web. Devdatta Akhawe, et al. (2013)" discloses a study of the prevalence of different types of false warnings when browsers report TLS errors, providing a framework for said browsers to reevaluate their current warning mechanisms and conserve user attention.

SUMMARY

The disclosure herein is focused on gathering as many malign X.509 certificates in SSL/TLS communications as possible and to measure the amount of polymorphism that they exhibit for establishing effective IDS/IPS signatures on the SSL handshake and building certificates blacklists to be included in current network security tools. This novel technique will make network security tools improve their malware detection ratios with encrypted traffic network.

The subject matter herein disclosed provides a unique and flexible solution to the detection of malware in encrypted network communications.

A first object of the present disclosure is a computer implemented method of analyzing X.509 certificates in SSL/TLS communications that gathers as many malign X.509 certificates as possible. The described solution monitors and tracks said certificates and determines their grade of polymorphism and their evolution over time. The method works by periodically connecting to a given pool of IP addresses of malign network servers through SSL/TLS channels and extracting the X.509 certificates from the SSL Handshake with the remote server HTTPS traffic. The information extracted with the method may be used to develop malware signatures and malware behavior characterization that will increase the detection ratio of current network security tools, which is very low when coping with malware using encrypted communication channels.

The computer implemented method of analyzing X.509 certificates in SSL/TLS communications, comprises using a data-processing system that in turn comprises a certificate collector, a certificate classifier having a processor and a certificate database. The method further comprises extracting X.509 certificates, using the certificate collector, from SSL/TLS Handshake protocols and storing the extracted X.509 certificate in the certificate database if:
- the X.509 certificate is not previously stored in the certificate database; or,
- the X.509 certificate exhibits a grade of polymorphism with respect to a previously stored version of the X.509 certificate, the grade of polymorphism being evaluated by the processor.

In a particular embodiment of the disclosure, previously to extracting the X.509 certificates, the method further comprises connecting to at least one IP address of a network server through SSL/TLS communications protocol.

In another particular embodiment of the disclosure, the method comprises periodically requesting, by means of the certificate collector, X.509 certificates to a command and control infrastructures of the network server.

In another particular embodiment of the disclosure, in order to evaluate the grade of polymorphisms that the X.509 certificate exhibits, the method compares the extracted X.509 certificate with a previously stored version of the same X.509 certificate. This comparing step is carried out by the processor integrated of the classifier module.

In another particular embodiment of the disclosure, method further comprises creating, using an anonymizer module, a virtual private network (VPN) that is configured by changing the visible IP address of the VPN every time the system requests the X.509 certificates to the same command and control infrastructure.

In another particular embodiment of the disclosure, once the X.509 certificate has been extracted from the SSL/TLS Handshake protocols, the method checks that the received X.509 certificate is valid and corresponds with a network server from which is requested.

In another particular embodiment of the disclosure, previously to evaluating the grade of polymorphism that the X.509 certificates exhibit, the method further checks, using a certificate validator module, whether the X.509 certificate is: a self-signed certificate, an invalid certificate or a certificate signed by a trusted certification authority.

In another particular embodiment of the disclosure, the method comprises creating effective IDS/IPS signatures on the SSL/TLS Handshake based on the X.509 certificates stored in the certificate database.

In another particular embodiment of the disclosure, the method further comprises creating certificate blacklists with signatures of the X.509 certificates stored in the certificate database, to be included in current network security tools.

In another particular embodiment of the disclosure, the requesting of the X.509 certificates to the C&C infrastructure is made through a 443/TCP port of the network server.

The present disclosure is focused on the detection of X.509 certificates. Some malware families use non standard implementations for encrypting communications. However, these cases are easier to detect because they attract attention, they are not conventional. Currently, the main difficulty is to detect malign SSL/TLS certificates.

Port 443/TCP is of special interest for the present disclosure since it is the port employed by default by the secure systems to establish HTTPS communications. If a malware uses another port they attract attention from the security systems.

A second object of the present disclosure is the data processing system that performs the method previously described.

Said data-processing system comprises:
- the certificate collector that comprises means for requesting, detecting and extracting the X.509 certificates from the command and control infrastructures of the at least one network server;
- the certificate classifier, having a processor, that analyzes the extracted X.509 certificates evaluating a grade of polymorphism that the X.509 certificates exhibit; and,
- the certificate database wherein the X.509 certificates not previously stored in the certificate database, and X.509 certificates previously stored in the database but that exhibit a grade of polymorphism with respect to a previously stored version of the same X.509 certificate, are stored.

The certificate database further stores information extracted by the parser module regarding the stored X.509 certificates. Said information at least comprises information from all the fields of the certificate, the date in which the certificate has been extracted and the network server from which it has been extracted.

In a particular embodiment of the disclosure, the certificate collector further comprises:
- a requester module for detecting SSL/TLS Handshakes protocols of the command and control infrastructures of the network servers that comprises means for requesting the X.509 certificates from the network servers; and,
- an anonymizer module that creates virtual private networks (VPN) for hiding an identity of the certificate collector to the network servers.

In other particular embodiment of the disclosure, the certificate classifier further comprises:
- a parsing module that comprises means for extracting information from the X.509 certificate, the information being selected from issuer, validity, expiration date, certificate hash and a combination thereof; and,
- a certificate validator module that checks if the X.509 certificates are self-signed certificates, invalid certificates or certificates signed by a trusted certification authority.

A third object of the present disclosure is the computer program adapted to perform the computer implemented method described below.

A fourth object of the present disclosure is the computer readable storage medium comprising the mentioned computer program.

DETAILED DESCRIPTION

Embodiments of the disclosure will now be described with references to the accompanying figures, with like reference numerals referring to like elements throughout. The terminology used in the description is not intended to be interpreted in any limited or restrictive manner, simply because it is being used in conjunction with a detailed description of certain embodiments. Furthermore, various embodiments (whether or not specifically described herein) may include novel features, no single one of which is solely responsible for its desirable attributes or which is essential to practicing the subject matter described herein.

Figure 1:
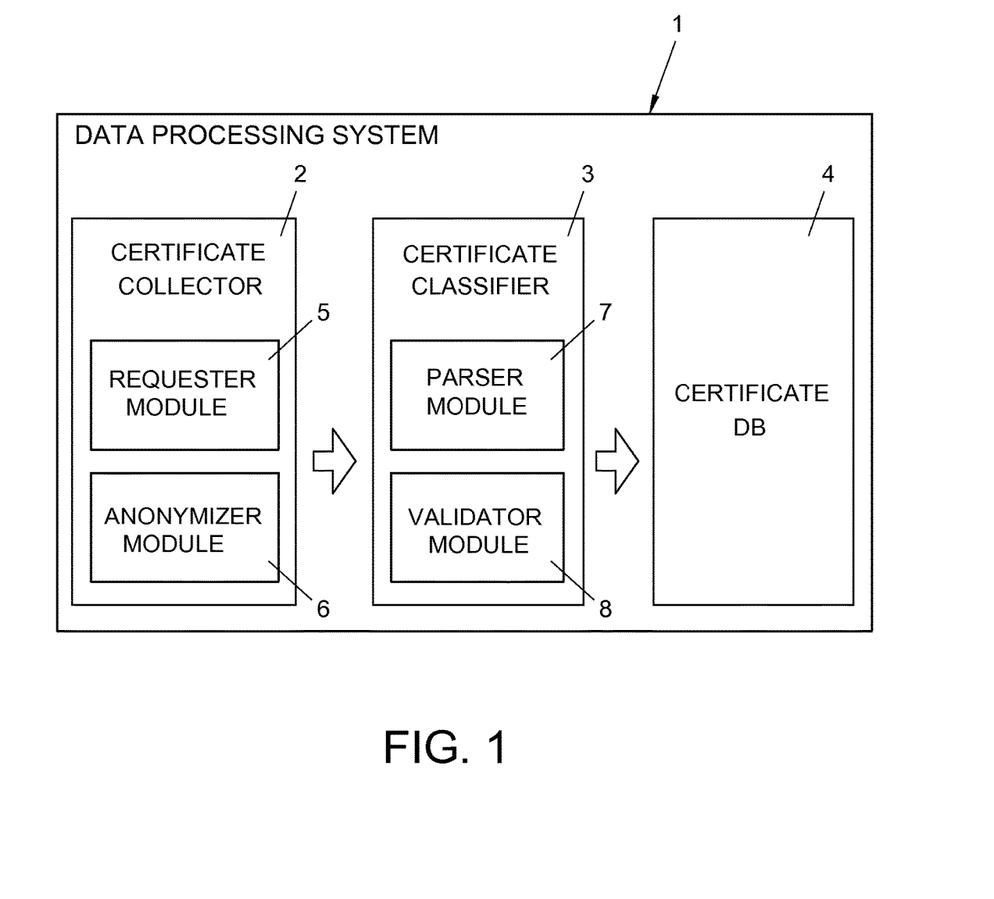
FIG. 1 shows a particular embodiment of the data processing system that carries out the computer implemented method of analyzing SSL/TLS certificates, object of the present disclosure.

FIG. 1 shows a particular embodiment of the data processing system (1) presented in this document consisting of three main elements. The Certificate Collector (2), in charge of the task of X.509 certificate gathering. The gathering of certificates is preferably carried out from network systems previously identified as malign, although the gathering may be carried out from benign network servers as a surveillance task. Certificates obtained by the Certificate Collector are analyzed (parsed and validated) by the Certificate Classifier (3). Finally, analyzed certificates are stored into the Certificate Database (4) only if: the certificates are new (not previously stored in the Database (4)) or if said certificates are not new but they show certain grade of polymorphism with respect to the previously stored version of said certificates.

The Certificate Collector (2) is able to obtain X.509 certificates and monitor whether (and how frequently) said X.509 certificates of the C&C infrastructures of the malign network servers change over time. The Certificate Collector (2) periodically launches the Requester module (5) and connects to a given IP address through SSL/TLS communications protocol and captures the SSL handshake with the remote server of the Command and Control infrastructure. The X.509 certificates are obtained from said SSL (or TLS) handshake. To hide the Requester module (5) identity, the Certificate Collector (2) uses an Anonymizer module (6). The Anonymizer module (6) that uses a Virtual Private Network (VPN), changes the exit node of the VPN (its visible IP address) for each gathering interval. Preferably this gathering interval has been established in 12 hours. However, this interval could be any other one depending on the necessity of the moment.

The Certificate Classifier (3), by using a processor, is in charge of analyzing the X.509 certificates collected by the Certificate Collector (2). This analysis is split in two main steps: parsing and validation. The parsing stage is carried out by the Parser module (7) which extracts as much information as possible from the X.509 certificate including, among others fields: "Issuer", "Issued by", "Valid from", "Expiration date" and "certificate hash". The certificate data obtained by the Parser module (7) will be used to cluster X.509 certificates with similarities. The validation stage is carried out by the Validator module (8) that checks that the certificate presented corresponds to the website visited and is valid (e.g. "within validity period", "not revoked", . . . ). The first step in the validation stage is to check if the malware is using self-signed certificates ("not signed by any trusted Certification Authority", "CA", . . . ), invalid certificates (with some type of error), or proper certificates signed by a trusted CA (which would raise questions about the checks performed by the CA).

The Certificate Database (4) stores the certificates and information about the analysis of said certificates in a centralized manner. This certificate database could be a Structured Query Language (SQL database which aggregates information from all the results returned by the Certificate Classifier (3). The Certificate Database (4) also helps with the analysis by enabling a convenient way to perform queries over the data.

Figure 2:
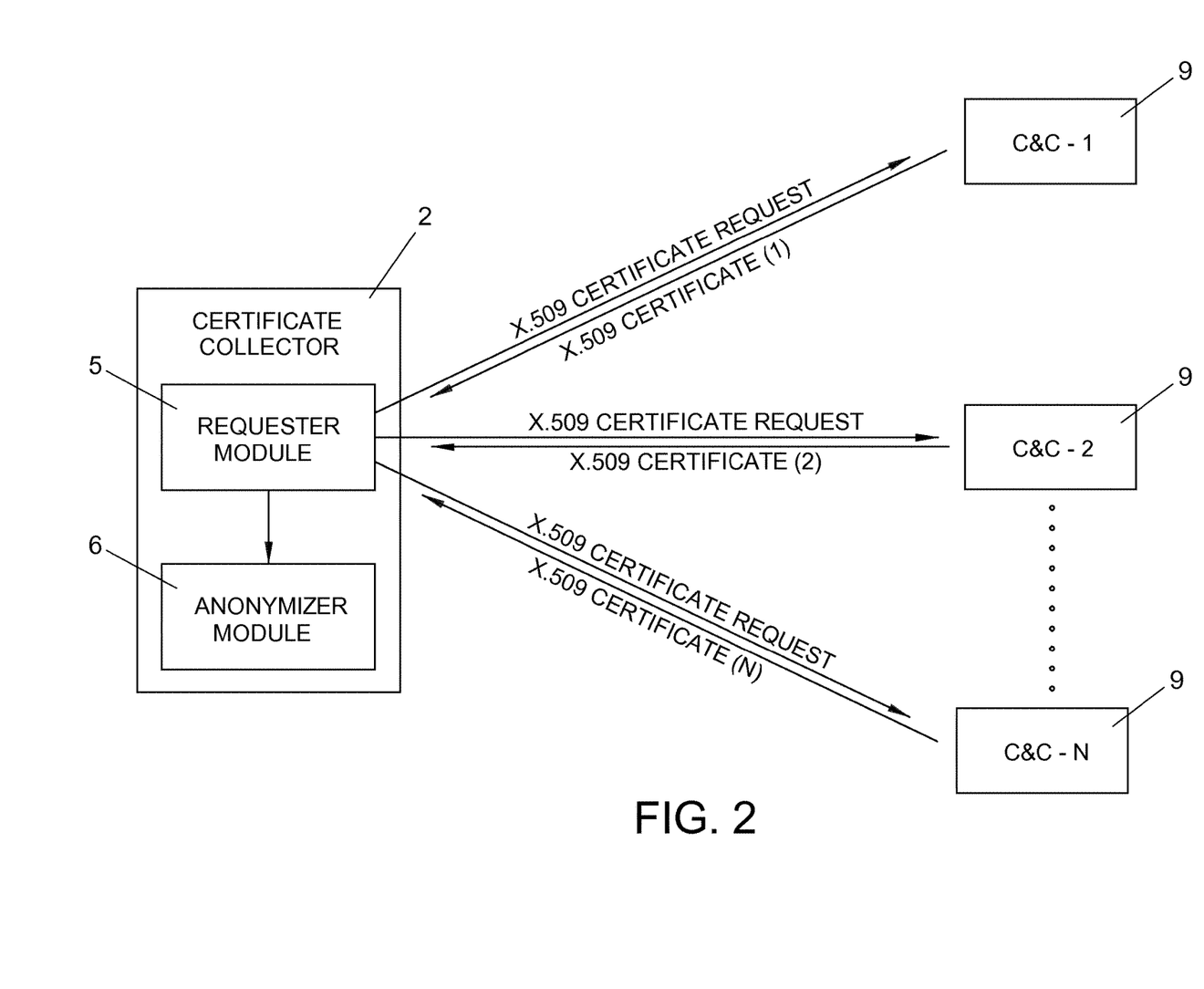
FIG. 2 shows a particular embodiment of the certificate Collector performance, in which the SSL certificate is requested from a plurality of command and control infrastructures.

FIG. 2 shows a particular embodiment of the Certificate Collector (2) performance. In order to establish signatures and behavior patterns for new malware using SSL/TLS encrypted communication channels, it is key to create a database to store as many certificates as possible. For every known C&C infrastructure (9), the Certificate Collector (2) periodically requests, by means of its requester module (5), its X.509 certificates though the SSL/TLS communications channels and then processes the received X.509 certificates to establish differences with the last one received. Every time the requester module (5) requests the X.509 certificates from the known C&C infrastructures (9) it changes its visible IP address, by means of the Anonymizer module (6).

Figure 3:
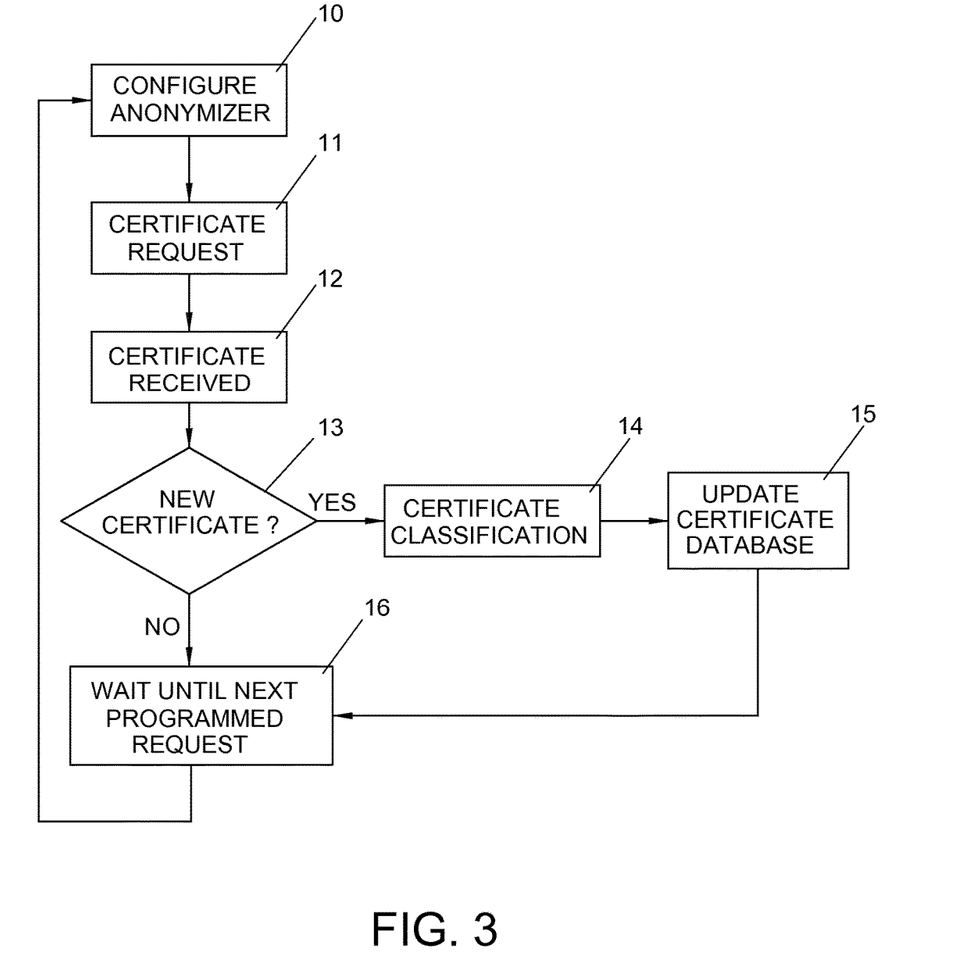
FIG. 3 shows a flow chart of a particular embodiment of the computer implemented method for analyzing SSL/TLS certificates, object of the present disclosure.

FIG. 3 shows a particular embodiment of the computer implemented method object of the present disclosure. With a programmed frequency, the Certificate Collector (2) starts an interrogation round through all the C&C infrastructures (9) of the network systems previously identified as malign. Previously, in order to hide the requester identity the Anonymizer module (6) configures (10) a VPN by changing the visible IP address previously used by the Certificate Collector (5). Then the certificate requests are launched (11) to the C&C infrastructures (9). The received (12) X.509 certificates are compared, by means of a processor, with other X.509 certificates previously stored in the Certificate Database (4) and if they are new (13) then they are sent (14) to the Certificate Classifier (3) that, through the Certificate Parser and the Certificate Validator, extracts all the information from said certificates and send them to the Certificate Database (4) that it is updated (15). When the received certificate is processed, the data processing system (1) is able to establish differences with the certificates received in the previous request. Then the data processing system (1) waits (16) until the period for the next programmed request expires. The certificates are also stored if said X.509 certificates are already stored in the certificate database (4) but they present any grade of polymorphism with respect to the version of the same X.509 certificate previously stored. Then this new version of the X.509 certificate is also considered as a new X.509 certificate and it is stored in the database (4). If the X.509 certificates are not new and they do not exhibit any grade of polymorphism with respect to the version of the same X.509 certificate previously stored, they are discarded and the data processing data waits (16) until the period for the next programmed request expires. Then the method is repeated.

The disclosure presented herein will provide new means to improve current defense tools by means of the analysis of the Certificate Database created. Three different possible malware detection techniques to be developed based on the information stored into the database have been foreseen:

Certificate blacklists: creating malign certificate blacklists based on the malign X.509 certificates stored in the certificate Database (4). It is the easiest but weakest detection technique. The quicker the certificates are updated by malware, the quicker the blacklist needs to be updated and redistributed to all tools that may use the blacklist;

Network signatures on the SSL handshake: creating Network signatures on the SSL handshake based on the malign X.509 certificates stored in the certificate Database (4). They are a detection technique that could be deployed on existing IDS like Snort; and Anomaly detection: using anomaly detection techniques based on the malign X.509 certificates stored in the certificate Database (4). The advantage of anomaly detection is that it may detect malware families that have not been seen previously. The disadvantage is that they tend to have larger false positives. To improve this issue, the invention may be used to also extract benign certificates and then look for features that distinguish malicious and benign certificates.

In a particular embodiment of the present disclosure, it would rely on open source software to provide certain components to the system, like secure communication with OpenSSL.

Examples of particular application of the present disclosure could be: IT defense tools (antivirus, IDS/IPS, network traffic sniffers . . . ) and for Internet Service Providers (ISPs) or public and private Computer Emergency Response Teams (CERTs) and Computer Security Incident Response Teams (CSIRTs).

The description of the different embodiments and implementations has been presented for purposes of illustration and description, and is not intended to be exhaustive or limited to the implementations in the form disclosed. Many modifications and variations will be apparent to those of ordinary skill in the art. Further, different embodiments and implementations may provide different attributes as compared to other embodiments and implementations. The embodiments or implementations selected are chosen and described in order to best explain the principles of the implementations, the practical application, and to enable others of ordinary skill in the art to understand the disclosure for various implementations with various modifications as are suited to the particular use contemplated. This written description uses examples to disclose various implementations, which include the best mode, to enable any person skilled in the art to practice these implementations, including making and using any devices or systems and performing any incorporated methods. The patentable scope is defined by the claims, and may include other examples that occur to those skilled in the art. Such other examples are intended to be within the scope of the claims if they have stages that do not differ from the literal language of the claims, or if they include equivalent stages with unsubstantial differences from the literal language of the claims.

Further, the disclosure comprises embodiments according to the following clauses:

Clause 1. A computer implemented method of analyzing X.509 certificates in SSL/TLS communications, comprising a dataprocessing system comprising a certificate collector, a certificate classifier having a processor and a certificate database, characterized in that the method comprises the following phases:
  i) extracting X.509 certificates, using the certificate collector, from SSL/TLS Handshake protocols;
  ii) storing the X.509 certificate in the certificate database if:
    the X.509 certificate is not previously stored in the certificate database; or,
    the X.509 certificate exhibits a grade of polymorphism with respect to a previously stored version of the X.509 certificate, the grade of polymorphism being evaluated by the processor.

Clause 2. The computer implemented method of analyzing X.509 certificates in SSL/TLS communications, according to clause 1, wherein previously to phase i) the method further comprises connecting to at least one IP address of a network server through SSL/TLS communications protocol.

Clause 3. The computer implemented method of analyzing X.509 certificates in SSL/TLS communications, according to clause 2, wherein the method comprises periodically requesting, by means of the certificate collector, X.509 certificates to a command and control infrastructures of the network server.

Clause 4. The computer implemented method of analyzing X.509 certificates in SSL/TLS communications, according to clause 1, wherein to evaluate the grade of polymorphisms that the X.509 certificate exhibits, the method compares the extracted X.509 certificate with a previously stored version of the same X.509 certificate.

Clause 5. The computer implemented method of analyzing X.509 certificates in SSL/TLS communications, according to clause 3, wherein the method further comprises creating, using an anonymizer module, a virtual private network (VPN) that is configured by changing the visible IP address of the VPN every time the system requests the X.509 certificates from the same command and control infrastructure.

Clause 6. The computer implemented method of analyzing X.509 certificates in SSL/TLS communications, according to clause 1, wherein, once the X.509 certificate has been extracted from the SSL/TLS Handshake protocols, the method checks that the received X.509 certificate is valid and corresponds with a network server to which is requested.

Clause 7. The computer implemented method of analyzing X.509 certificates in SSL/TLS communications, according to clause 1, wherein, previously to evaluating the grade of polymorphism that the X.509 certificates exhibit, the method further checks, using a certificate validator module, if the X.509 certificate is:
  a self-signed certificate;
  an invalid certificate; or,
  a certificate signed by a trusted certification authority.

Clause 8. The computer implemented method of analyzing X.509 certificates in SSL/TLS communications, according to any of the preceding clauses, wherein the method comprises creating effective IDS/IPS signatures on the SSL/TLS Handshake based on the X.509 certificates stored in the certificate database.

Clause 9. The computer implemented method of analyzing X.509 certificates in SSL/TLS communications, according to any of the preceding clauses, wherein the method further comprises creating certificate blacklists with signatures of the X.509 certificates stored in the certificate database, for being included in current network security tools.

Clause 10. The computer implemented method of analyzing X.509 certificates in SSL/TLS communications, according to clause 3, wherein the requesting of the X.509 certificates is made through a 443/TCP port of the network server.

Clause 11. A data-processing system comprising means for carrying out the method disclosed in any of clauses 1 to 10, characterized in that the data processing system comprises:
  the certificate collector that comprises means for requesting, detecting and extracting the X.509 certificates from the command and control infrastructures of the at least one network server;

the certificate classifier, having a processor, that analyzes the extracted X.509 certificates evaluating a grade of polymorphism that the X.509 certificates exhibit; and, the certificate database wherein the X.509 certificates not previously stored in the certificate database, and X.509 certificates previously stored in the database but that exhibit a grade of polymorphism with respect to a previously stored version of the X.509 certificates, are stored.

Clause 12. A data-processing system, according to clause 11, wherein the certificate collector comprises:
a requester module for detecting SSL/TLS Handshakes protocols of the command and control infrastructures of the network servers that comprises means for requesting the X.509 certificates from the network servers; and,
an anonymizer module that creates virtual private networks (VPN) for hiding an identity of the certificate collector to the network servers.

Clause 13. A data-processing system, according to clause 11, wherein the certificate classifier comprises:
a parsing module that comprises means for extracting information from the X.509 certificate, the information being selected from issuer, validity, expiration date, certificate hash and a combination thereof; and,
a certificate validator module that checks if the X.509 certificates are self-signed certificates, invalid certificates or certificates signed by a trusted certification authority.

Clause 14. A computer program adapted to perform the computer implemented method of any of clauses 1 to 10.

Clause 15. A computer readable storage medium comprising the program of clause 14.

What is claimed is:

1. A method comprising:
extracting a security certificate used during a secure handshake protocol;
storing the security certificate in a certificate database when the security certificate is not previously stored in the certificate database;
determining whether the security certificate exhibits a grade of polymorphism with respect to a stored version of the security certificate when the security certificate is previously stored in the certificate database; and
storing the security certificate in the certificate database when the security certificate exhibits a grade of polymorphism with respect to the stored version of the security certificate.

2. The method of claim 1, wherein the security certificate is a X.509 certificate.

3. The method of claim 1, wherein the secure handshake protocol includes a secure socket layer (SSL) handshake protocol, a transport layer security (TLS) handshake protocol, or both.

4. The method of claim 1, further comprising connecting to a network server via the secure handshake protocol.

5. The method of claim 4, wherein connecting to the network server is performed via a 443 port or a TCP port of the network server.

6. The method of claim 4, further comprising periodically sending security certificate requests to one or more command and control infrastructures of the network server, the security certificate corresponding to at least one of the security certificate requests.

7. The method of claim 6, further comprising creating a virtual private network and changing a visible internet protocol (IP) address between each security certificate request to same command and control infrastructures.

8. The method of claim 1, further comprising determining whether the security certificate is valid and corresponds with a network server, from which the security certificate is requested.

9. The method of claim 1, further comprising determining whether the security certificate is a self-signed certificate, an invalid certificate, or a certificate signed by a trusted certification authority.

10. The method of claim 1, further comprising creating effective intrusion detection system (IDS) signatures, intrusion prevention system (IPS) signatures, or both, based on stored security certificates in the certificate database.

11. The method of claim 1, further comprising creating a certificate blacklist based on stored security certificates in the certificate database.

12. A non-transitory computer readable medium storing instructions that, when executed by a processor, causes the processor to perform operations comprising:
periodically sending security certificate requests to one or more command and control infrastructures of a network server;
extracting a security certificate received from the network server and used during a secure handshake protocol associated with at least one of the security certificate requests;
storing the security certificate in a certificate database when the security certificate is not previously stored in the certificate database; and
storing the security certificate in the certificate database when a stored version of the security certificate in the certificate database exhibits a grade of polymorphism with respect to the stored version of the security certificate.

13. The non-transitory computer readable medium of claim 12, wherein the operations further include creating a virtual private network and changing a visible interne protocol (IP) address between each security certificate request to same command and control infrastructures.

14. The non-transitory computer readable medium of claim 12, wherein the operations further include determining whether the security certificate is a self-signed certificate, an invalid certificate, or a certificate signed by a trusted certification authority.

15. The non-transitory computer readable medium of claim 12, wherein the operations further include creating effective intrusion detection system (IDS) signatures, intrusion prevention system (IPS) signatures, or both, based on stored security certificates in the certificate database.

* * * * *

UNITED STATES PATENT AND TRADEMARK OFFICE
CERTIFICATE OF CORRECTION

PATENT NO.         : 9,621,544 B2
APPLICATION NO.    : 14/789231
DATED              : April 11, 2017
INVENTOR(S)        : Taboso It is certified that error appears in the above-identified patent and that said Letters Patent is hereby corrected as shown below:

In the Claims

Column 10, Line 45, Claim 13 should read:
13. The non-transitory computer readable medium of claim 12, wherein the operations further include creating a virtual private network and changing a visible internet protocol (IP) address between each security certificate request to same command and control infrastructures.

Signed and Sealed this
Thirtieth Day of May, 2017

Michelle K. Lee
*Director of the United States Patent and Trademark Office*